United States Patent
Lee

(10) Patent No.: US 8,312,790 B2
(45) Date of Patent: Nov. 20, 2012

(54) ONE TOUCH COMBINATION STRUCTURE OF KNOB FOR AUTOMATIC TRANSMISSION

(75) Inventor: Sung Il Lee, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 262 days.

(21) Appl. No.: 12/573,745

(22) Filed: Oct. 5, 2009

(65) Prior Publication Data

US 2011/0023645 A1    Feb. 3, 2011

(30) Foreign Application Priority Data

Jul. 30, 2009   (KR) .................. 10-2009-0070128

(51) Int. Cl.
*G05G 1/04*    (2006.01)

(52) U.S. Cl. ............................................ 74/523; 74/543

(58) Field of Classification Search .................... 74/523, 74/519, 543, 473.1, 557, 490.14, 493, 492, 74/473.12, 473.3, 473.21, 473.23; 200/61.54, 200/522; 464/87; 340/5.62; D15/28; *H01Q 1/32; B60R 21/00, 21/02; B62D 1/18; B60T 7/10*
See application file for complete search history.

(56) References Cited

U.S. PATENT DOCUMENTS

| 4,991,535 A * | 2/1991 | Kobayashi et al. .......... 116/28.1 |
| 2005/0109146 A1 * | 5/2005 | Jarjoura et al. ............ 74/473.21 |

FOREIGN PATENT DOCUMENTS

| JP | 2006219003 A | * | 8/2006 |
| JP | 2007223509 A | * | 9/2007 |

* cited by examiner

*Primary Examiner* — Troy Chambers
*Assistant Examiner* — Gregory Prather
(74) *Attorney, Agent, or Firm* — Morgan, Lewis & Bockius LLP

(57) ABSTRACT

A one touch combination structure of a knob for an automatic transmission may include the knob which is provided with an operation button, an insert which is interposed inside the knob, a lever pipe which is housed in the insert and a lower end portion of which is hingedly supported to regulate shift speeds, and an operation rod which is slidably inserted into the lever pipe and elastically supported therein so as to vertically move according to an operation of the operation button, wherein a first fitting protrusion and a second fitting protrusion having different width and length are provided at an inner circumference of the insert, and a first cut groove and a second cut groove respectively responding to the first fitting protrusion and the second fitting protrusion are formed at an upper end portion of the lever pipe.

16 Claims, 5 Drawing Sheets

ONE TOUCH COMBINATION STRUCTURE OF KNOB FOR AUTOMATIC TRANSMISSION

CROSS-REFERENCE TO RELATED APPLICATION

This application claims priority to Korean Patent Application No. 10-2009-0070128 filed on Jul. 30, 2009, the entire contents of which are incorporated herein for all purposes by this reference.

BACKGROUND OF THE INVENTION

1. Field of the Invention

The present invention relates to a one touch combination structure of a knob for an automatic transmission in which a knob can be easily combined by a one touch type.

2. Description of Related Art

An automatic transmission equipped to a vehicle is a device which automatically shifts gear ratios in accordance with driving conditions, and reduces driver's effort for shifting gears to enhance driving convenience and makes starting, acceleration and deceleration easy to enhance ride comfort.

However, even using such an automatic transmission, an automatic transmission assembly which is provided near a driver seat should be operated for parking, neutral, forward driving, and rearward driving.

Generally, such a gear shift lever for an automatic transmission includes a lever pipe which is integrally connected to an arm member to be hingedly supported and upwardly erects by a predetermined length from a top cover, and a knob which is coupled to a top of the lever pipe and acts as a grip for a driver.

In a conventional automatic transmission assembly, a male screw part is formed at a top end of the lever pipe, and a female screw part corresponding to the male screw part is formed an inner circumference of the knob, and the lever pipe and the knob are coupled by screw coupling of the male screw part and the female screw part.

However, in such a structure, the knob should be rotated in a predetermined number for assembling, so there is a problem in that assembling time is long and position of the knob may be varied according to tightening force of a worker.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a one touch combination structure of a knob for an automatic transmission in which the knob can be assembled by a one touch combination type instead of a conventional screw combination type, so the knob can be easily and conveniently connected and disconnected thereby enhancing workability.

In addition, the present invention has been made in an effort to provide a one touch combination structure of a knob for an automatic transmission in which the assembled position of the knob can be constantly maintained regardless of tightening force of a worker, so assembling credibility of an automatic transmission assembly can be improved.

In an aspect of the present invention, the one touch combination structure of a knob for an automatic transmission may include the knob which is provided with an operation button, an insert which is interposed inside the knob, a lever pipe which is housed in the insert and a lower end portion of which is hingedly supported to regulate shift speeds, and an operation rod which is slidably inserted into the lever pipe and elastically supported therein so as to vertically move according to an operation of the operation button, wherein a first fitting protrusion and a second fitting protrusion having different width and length are provided at an inner circumference of the insert, and a first cut groove and a second cut groove respectively responding to the first fitting protrusion and the second fitting protrusion are formed at an upper end portion of the lever pipe.

A stopper which protrudes toward a center of the insert may be provided at the inner circumference of the insert above the first and the second fitting protrusions such that an inner diameter of the insert becomes narrower to form a guide hole to receive the operation rod therein.

The first fitting protrusion and the second fitting protrusion may be spaced with about 180 degree in a rotational direction A longitudinal length of the first fitting protrusion may be longer than a longitudinal length of the second fitting protrusion.

The first fitting protrusion may be formed such that a width of an upper end portion thereof is greater than a width of the first cut groove and a width of a lower end portion thereof is smaller than the width of the first cut groove so that the first fitting protrusion is forcibly indented into the first cut groove.

A width of the first fitting protrusion may become gradually narrow as the width of the first fitting protrusion goes downwardly such that the lower end portion thereof is slidably guided into the first cut groove.

The second fitting protrusion may be formed such that a width of an upper end portion thereof is greater than a width of the second cut groove and a width of a lower end portion thereof is smaller than the width of the second cut groove so that the second fitting protrusion is forcibly indented into the second cut groove.

The second fitting protrusion may be formed such that a width thereof becomes gradually narrow as the width of the second fitting protrusion goes downwardly such that the lower end portion thereof is slidably guided into the second cut groove.

A width of a lower end portion of the first fitting protrusion may be greater than a width of the second cut groove.

A stopper which protrudes toward a center of the insert may be provided at the inner circumference of the insert above the first and the second fitting protrusions such that an inner diameter of the insert becomes narrower to form a guide hole to receive the operation rod therein.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
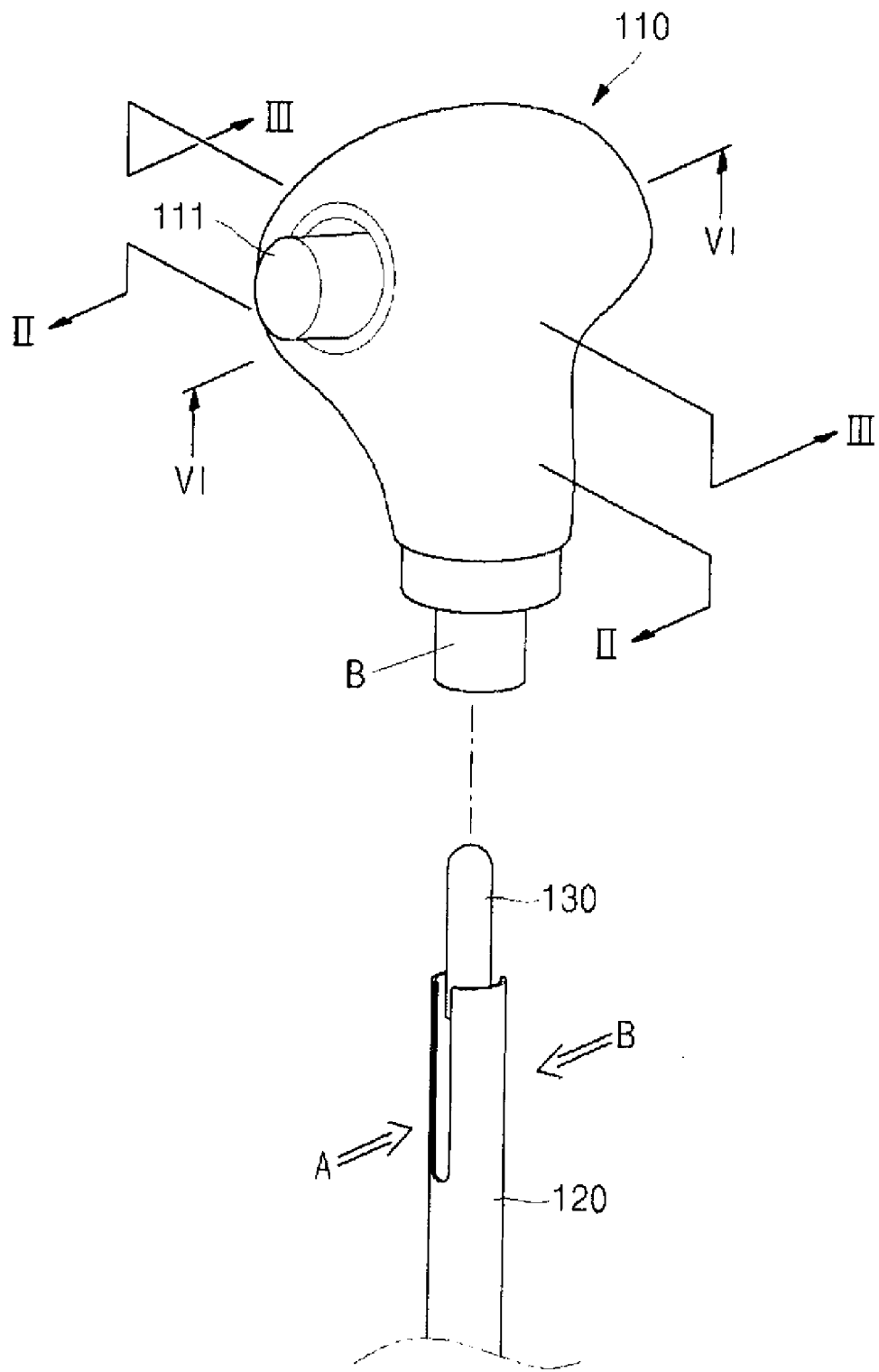
FIG. 1 is a drawing showing a one touch combination structure of a knob for an automatic transmission according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the drawing.

Figure 2:
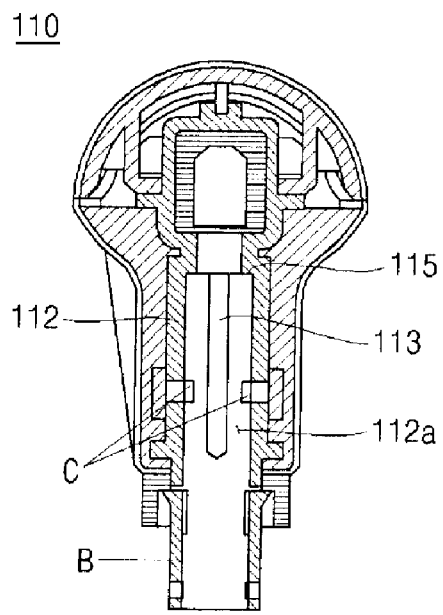
FIG. 2 is a sectional view along a line II-II in FIG. 1.
Figure 3:
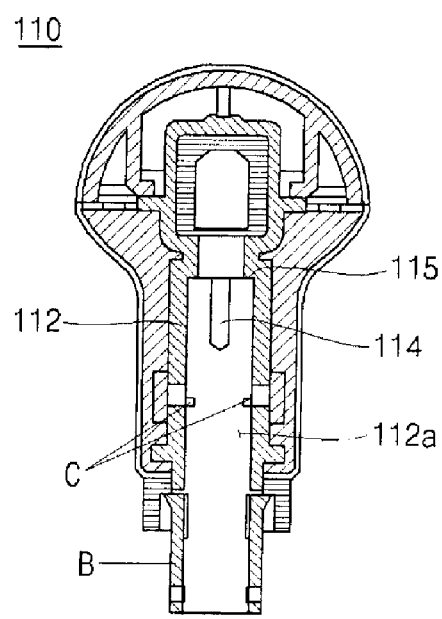
FIG. 3 is a sectional view along a line III-III in FIG. 1.
Figure 4:
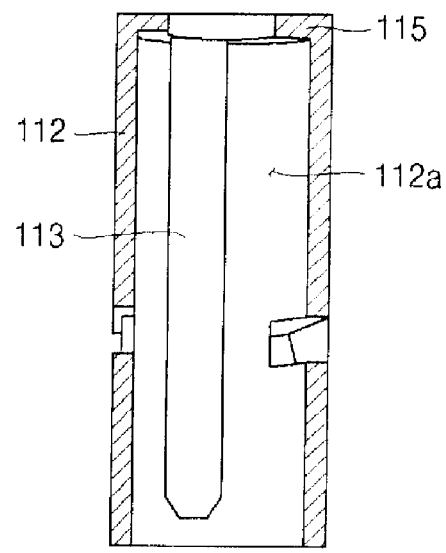
FIG. 4 is an enlarged view of a first fitting protrusion of FIG. 2.
Figure 5:
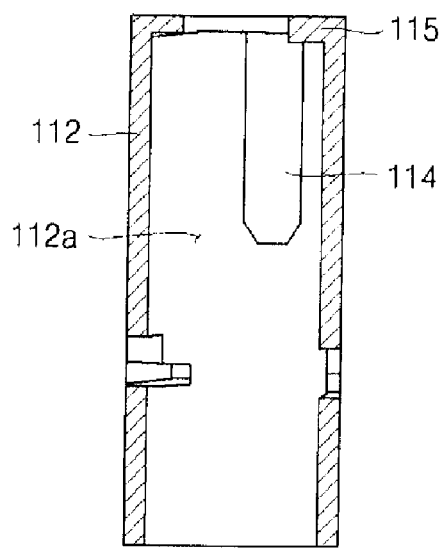
FIG. 5 is an enlarged view of a second fitting protrusion of FIG. 3.
Figure 6:
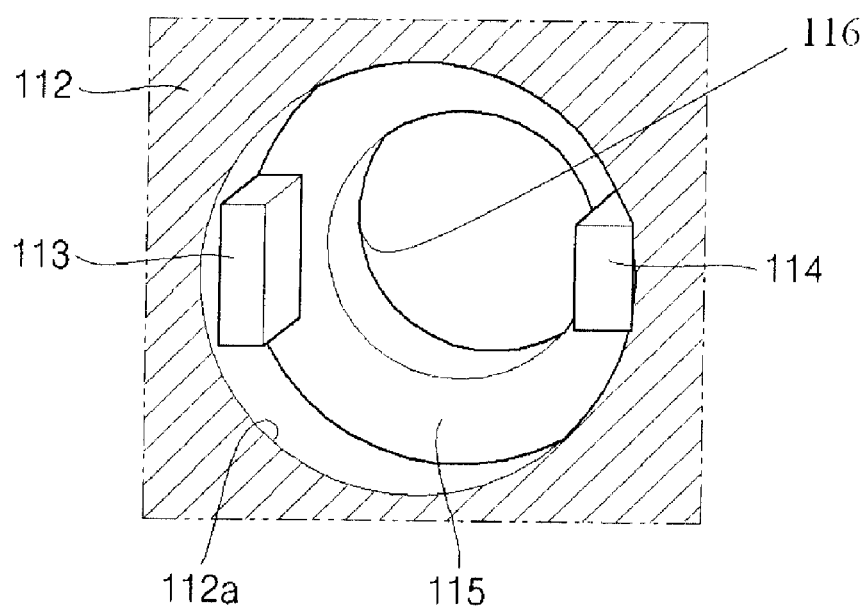
FIG. 6 is a sectional view along a line VI-VI in FIG. 1.
Figure 7:
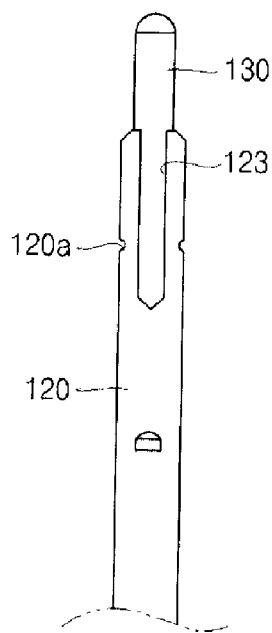
FIG. 7 is a side view as seen from a direction A in FIG. 1.
Figure 8:
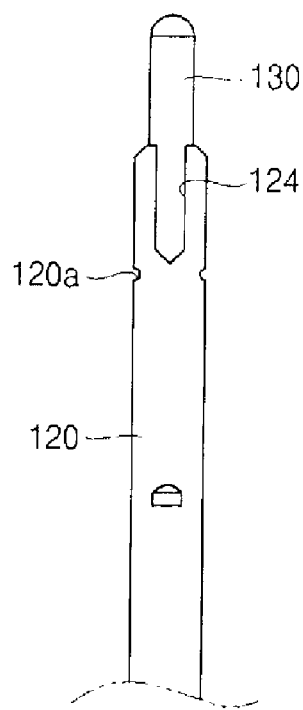
FIG. 8 is a side view as seen from a direction B in FIG. 1.
Figure 9:
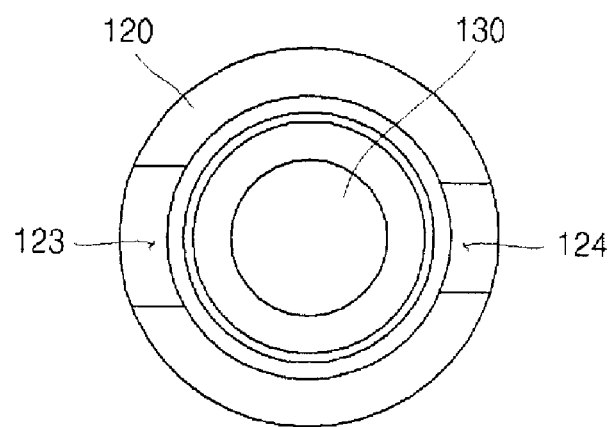
FIG. 9 is a top view showing a lever pipe and an operation rod in FIG. 1.

FIG. 1 is a drawing showing a one touch combination structure of a knob for an automatic transmission according to an exemplary embodiment of the present invention, FIG. 2 is a sectional view along a line II-II in FIG. 1, FIG. 3 is a sectional view along a line III-III in FIG. 1, FIG. 4 is an enlarged view of a first fitting protrusion of FIG. 2, FIG. 5 is an enlarged view of a second fitting protrusion of FIG. 3, FIG. 6 is a sectional view along a line VI-VI in FIG. 1, FIG. 7 is a side view as seen from a direction A in FIG. 1, FIG. 8 is a side view as seen from a direction B in FIG. 1, and FIG. 9 is a top view showing a lever pipe and an operation rod in FIG. 1.

As shown in FIG. 1, a gear shift lever of an automatic transmission according to an exemplary embodiment of the present invention includes a knob 110 which is installed to provide a grip, a lever pipe 120, an upper end of which is housed within the knob 110 and a lower end of which is coupled to an arm member to regulate shift speeds, and an operation rod 130 which is inserted into the lever pipe 120 and vertically moves according to push of an operation button 111 which will be explained below.

At this time, the operation button 111 is provided at a side of the knob 110 to prevent malfunction of the gear shift lever, and when the operation button 111 is pushed, gear shifting is possible.

As shown in FIGS. 2 and 3, an insert 112 is interposed inside the knob 110 so that the knob 110 can be firmly connected to the lever pipe 120.

In addition, as shown in FIG. 4 to FIG. 6, a first fitting protrusion 113 and a second fitting protrusion 114 which have different width and length are disposed as a pair to face one another at an inner circumference 112a of the insert 112, and a stopper 115 which protrudes toward a center is provided at the inner circumference 112a above the fitting protrusions 113 and 114 such that an inner diameter becomes narrower.

The stopper 115 can be used to prevent excessive assembling with the lever pipe 120. The stopper 115 includes a guide hole 116 to receive the operation rod 130 therethrough so as to be selectively engaged with the operation button 111.

In particular, the first fitting protrusion 113 is formed such that width of an upper end thereof is a little bit bigger than an inner diameter of a first cut groove 123 of the lever pipe 120 so as to be indented into the first cut groove 123, and is formed such that width of a lower end thereof becomes gradually narrow as it goes downwardly so that a lower end thereof can be guided into the first cut groove 123 of the lever pipe 120.

It is preferable that width of a lower end of the first fitting protrusion 113 is at least bigger than the second fitting protrusion 114.

Meanwhile, an inner bottom of the lever pipe 120 is formed as a closed hollow type, and an elastic member which can return the operation rod 130 to its original position is disposed between the closed hollow of the lever pipe 120 and the operation rod 130.

A detent pin which performs locking function according to movement of the operation rod 130 is penetrated in a diameter direction at a side of the lever pipe 120. In addition, as shown in FIG. 7 and FIG. 8, a pair of fixing clip support grooves 120a may be formed in an upper circumferential direction of the lever pipe 120.

Furthermore, a first cut groove 123 and a second cut groove 124 which are cut downwardly are formed at an upper end of the lever pipe 120 to be correspondent to the first and the second fitting protrusions 113 and 114.

That is, the first and the second cut grooves 123 and 124, as shown in FIG. 7 and FIG. 8, have different width and length, and are disposed to be apart from one another by a predetermined distance so as to have a structure into which the first and the second fitting protrusions 113 and 114 can be selectively indented.

Reference numeral B denotes a boot which is provided below the insert 112 and reference numeral C denotes a fixing clip.

A one touch combination structure of a knob for an automatic transmission according to an exemplary embodiment of the present invention will be explained with reference to the drawings hereinafter.

At first, a worker inserts the operation rod 130 and the lever pipe 120 into the knob 100 while grasping the knob 110.

At this time, a lower end of the first fitting protrusion 113 is guided by the first cut groove 123, and if the knob 110 is inserted more than a predetermined depth, an upper end of the first fitting protrusion 113 is hooked by an upper portion of the first cut groove 123 thereby being temporarily assembled.

Accordingly, the second fitting protrusion 114 is positioned at an entrance of the second cut groove 124 to be in a state of just prior to being fitted.

Subsequently, a worker hits an upper end of the knob 110 using a rubber hammer to urge the first and the second fitting protrusions 113 and 114 to be indented into the first and the second cut grooves 123 and 124.

As such, if the first and the second fitting protrusions 113 and 114 are respectively fitted into the first and the second cut grooves 123 and 124, the stopper 115 of the insert 112 are seated onto an upper end of the lever pipe 120 so that combination is completed.

If a worker inserts the knob 110 in a reverse direction by mistake with respect to the operation rod 130 and the lever pipe 120, an lower end of the first fitting protrusion 113 responds to the second cut groove 124 and at this time width of the first fitting protrusion 113 is greater than the second cut groove 124 so that they cannot be assembled.

As described above, according to one touch combination structure of a knob for an automatic transmission according to an exemplary embodiment of the present invention, the knob can be assembled by a one touch combination type instead of a conventional screw combination type, so the knob can be easily and conveniently connected and disconnected thereby enhancing workability.

In addition, the assembled position of the knob can be constantly maintained regardless of tightening force of a worker, so assembling credibility of an automatic transmission assembly can be improved.

For convenience in explanation and accurate definition in the appended claims, the terms "upper", "lower", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A one touch combination structure of a knob for an automatic transmission comprising:
    the knob provided with an operation button;
    an insert interposed inside the knob and including first and second fitting protrusions and formed inwards on an inner circumference thereof;
    a lever pipe housed in the insert for regulating shift speeds, the lever pipe including first and second cut grooves corresponding to and receiving the first fitting protrusion and the second fitting protrusion, respectively; and
    an operation rod which is slidably inserted into the lever pipe and elastically supported therein so as to vertically move according to an operation of the operation button,
    wherein the first and second fitting protrusions are protruded inwards in a radial direction of the insert and are extended in a longitudinal direction of the insert,
    wherein the first fitting protrusion has a width in a circumferential direction of the insert and a length in the longitudinal direction of the insert and the second fitting protrusion has a width in the circumferential direction of the insert and a length in the longitudinal direction of the insert,
    wherein the width of the first fitting protrusion is different from the width of the second fitting protrusion and the length of the first fitting protrusion is different from the length of the second fitting protrusion.

2. The one touch combination structure of claim 1, wherein a stopper which protrudes toward a center of the insert is provided at the inner circumference of the insert above the first and the second fitting protrusions such that an inner diameter of the insert becomes narrower to form a guide hole to receive the operation rod therein.

3. The one touch combination structure of claim 1, wherein the first fitting protrusion and the second fitting protrusion are located away from each other by angular interval of 180 degrees.

4. The one touch combination structure of claim 3, wherein a stopper which protrudes toward a center of the insert is provided at the inner circumference of the insert above the first and the second fitting protrusions such that an inner diameter of the insert becomes narrower to form a guide hole to receive the operation rod therein.

5. The one touch combination structure of claim 1, wherein the length of the first fitting protrusion in the longitudinal direction of the insert is longer than the length of the second fitting protrusion.

6. The one touch combination structure of claim 5, wherein a stopper which protrudes toward a center of the insert is provided at the inner circumference of the insert above the first and the second fitting protrusions such that an inner diameter of the insert becomes narrower to form a guide hole to receive the operation rod therein.

7. The one touch combination structure of claim 1, wherein the first fitting protrusion is formed such that a width of an upper end portion thereof is greater than a width of the first cut groove and a width of a lower end portion thereof is smaller than the width of the first cut groove so that the first fitting protrusion is forcibly indented into the first cut groove.

8. The one touch combination structure of claim 7, wherein a stopper which protrudes toward a center of the insert is provided at the inner circumference of the insert above the first and the second fitting protrusions such that an inner diameter of the insert becomes narrower to form a guide hole to receive the operation rod therein.

9. The one touch combination structure of claim 7, wherein a width of the first fitting protrusion becomes gradually narrow as the width of the first fitting protrusion goes downwardly such that the lower end portion thereof is slidably guided into the first cut groove.

10. The one touch combination structure of claim 9, wherein a stopper which protrudes toward a center of the insert is provided at the inner circumference of the insert above the first and the second fitting protrusions such that an inner diameter of the insert becomes narrower to form a guide hole to receive the operation rod therein.

11. The one touch combination structure of claim 1, wherein the second fitting protrusion is formed such that a width of an upper end portion thereof is greater than a width of the second cut groove and a width of a lower end portion thereof is smaller than the width of the second cut groove so that the second fitting protrusion is forcibly indented into the second cut groove.

12. The one touch combination structure of claim 11, wherein a stopper which protrudes toward a center of the insert is provided at the inner circumference of the insert above the first and the second fitting protrusions such that an inner diameter of the insert becomes narrower to form a guide hole to receive the operation rod therein.

13. The one touch combination structure of claim 11, wherein the second fitting protrusion is formed such that a width thereof becomes gradually narrow as the width of the second fitting protrusion goes downwardly such that the lower end portion thereof is slidably guided into the second cut groove.

14. The one touch combination structure of claim 13, wherein a stopper which protrudes toward a center of the insert is provided at the inner circumference of the insert above the first and the second fitting protrusions such that an inner diameter of the insert becomes narrower to form a guide hole to receive the operation rod therein.

15. The one touch combination structure of claim 1, wherein a width of a lower end portion of the first fitting protrusion is greater than a width of the second cut groove.

16. The one touch combination structure of one of claim 15, wherein a stopper which protrudes toward a center of the insert is provided at the inner circumference of the insert above the first and the second fitting protrusions such that an inner diameter of the insert becomes narrower to form a guide hole to receive the operation rod therein.

* * * * *